United States Patent Office.

CARL DANIEL EKMAN, OF 57½ OLD BROAD STREET, LONDON, ENGLAND.

EXTRACTION OF GELATINE, FAT, AND SIMILAR SUBSTANCES.

SPECIFICATION forming part of Letters Patent No. 307,754, dated November 11, 1884.

Application filed March 13, 1884. (No specimens.) Patented in England May 30, 1883, No. 2,680.

*To all whom it may concern:*

Be it known that I, CARL DANIEL EKMAN, a subject of the King of Sweden, residing at 57½ Old Broad Street, in the city of London, England, have invented certain new and useful Improvements in the Extraction of Gelatine, Fat, and Similar Substances from Bones, Hides, Fish, and other Animal Matter, (for which I have received Letters Patent in England, No. 2,680, dated May 30, 1883;) and I do hereby declare that the following is a full, clear, and exact description of the invention, which will enable others skilled in the art to which it appertains to make and use the same.

The object of this invention is to extract from bones, hides, fish, or other substances of animal origin their useful constituents (such as gelatine and fat) in such a manner as to obtain products of quality and color superior to those obtained by the ordinary methods; and the invention consists in boiling the raw materials under pressure in solutions containing sulphurous acid, with or without a base or alkali.

In carrying out this invention the substance to be treated is, if necessary, properly cleaned, then reduced by any suitable mechanical means to such a condition that during the subsequent boiling process the liquid employed may be able to permeate it. The attainment of this object may in some cases be assisted by exhausting the air from the bones previous to the introduction of the solution used in boiling. The substance thus prepared is placed in a boiler or vessel of the construction now generally used for boiling under steam-pressure vegetable substances in solutions containing sulphurous acid, (preferably heated by means of a steam-jacket,) and it is lined with lead or other metal or alloy capable of resisting the action of the chemicals employed; or it may be constructed wholly of such suitable metal or alloy.

The boiling solution with which I have obtained the best quality of gelatine (from fresh bones) has been one containing sulphurous acid and a base in the proportions forming the salt commonly called the "bisulphite," and the base I have found generally preferable has been magnesia. With such a solution a pressure of about five pounds to the square inch has given good results. If a solution of sulphurous acid alone (without a base) be employed under the same conditions, I have found the result less satisfactory. In this case the gelatine is more apt to become liquefied, (*i. e.*, the jelly formed on cooling is less solid,) and the color generally is not quite so good. When the production of fat is the main object in view, then the pressure employed may exceed ten pounds to the square inch. For instance, when fresh bones have been treated at ninety pounds pressure with a solution of bisulphite or sulphite of magnesia, fat of good quality and color has been obtained; but under these conditions the gelatine contained in the bones is not present in the liquid obtained in such condition as to gelatinize (or form a jelly) on cooling. In cases where the complete extraction of the gelatine and fat contained in the bones is desired, it will be found generally necessary to repeat the boiling operation. When gelatine of superior quality is desired, it is of great importance that the heating during the boiling operation should be very gradual, so as to avoid too high a temperature in any part of the liquid. The strength of the solution which I have found suitable is one which contains about three-quarters per cent. of sulphurous acid.

Having thus given general principles to guide the operator, I proceed to give an example of a convenient method of carrying out this invention in practice: Supposing it is desired to prepare gelatine of superior quality, I select good fresh bones, (or, if not fresh, preserved from change in their constituents by antiseptic or other suitable treatment.) These bones are freed from foreign matter by any suitable mechanical or chemical means, and are then broken into small pieces. (The size commercially known as "half-inch bones" I consider very suitable.) They are then placed in a boiler of the construction above directed. A solution of bisulphite of magnesia is then prepared, of such a strength that it shall contain about three-quarters per cent. of sulphurous acid, and with this the boiler is filled to such an extent that the bones shall be entirely covered by liquid during the whole boiling process. The boiler is then closed and the temperature gradually raised until the pressure reaches about five pounds to the square inch, at which point it is maintained for about three hours. The steam is then blown off and the liquid divided from the solids by any suitable means. The liquid is then allowed to cool, when the impurities gradually subside, while the fat rises to the top of the solution of gelatine. The separation of the solution of gelatine from the fat and from the impurities can then be easily effected by any suitable means, and it can be used as it is, or evaporated in the usual way; or, if it is desired to use it for some purpose where the admixture of salts of sulphurous acid is objectionable, these can be removed more or less perfectly by chemical means, such as by baryta.

The fats obtained from bones by this method are partly fluid and partly solid.

I am aware that sulphurous or sulphuric acid has been used to extract salt from fish-skins preparatory to the extraction of the gelatine, and also that it has been used to treat the refuse or residuum of glue-stock after the gelatine has been extracted therefrom, and I do not claim such use of it; but I am not aware that the process of extracting gelatine and fats from bones and similar material as herein described has ever before been known or used; and, therefore, Having fully described my invention, what I desire to claim and secure by Letters Patent is—

The manufacture of gelatine, fat, and similar substances from bones, hides, fish, and other substances of animal origin, by boiling under pressure in a solution containing sulphurous acid, with or without a base or alkali.

CARL DANIEL EKMAN.

Witnesses:
WILLIAM SPENCE,
JOHN D. VENN.